United States Patent [19]
Sloan

[11] 3,916,089
[45] Oct. 28, 1975

[54] BRACKET FOR CONDUCTORS

[75] Inventor: Donald Alfred Sloan, Winston-Salem, N.C.

[73] Assignee: Envirotech Corporation, Menlo Park, Calif.

[22] Filed: June 10, 1974

[21] Appl. No.: 477,739

[52] U.S. Cl. ............... 174/164; 24/73 AP; 174/171; 174/175; 191/32; 191/35; 248/68 R; 248/73; 248/74 A
[51] Int. Cl.² ................... H01B 17/18; B60M 1/34
[58] Field of Search ......... 174/40 CC, 95, 97, 99 R, 174/99 B, 149 R, 149 B, 158 R, 164, 171, 174, 175; 24/73 SA, 73 AP, 81 G; 248/68 R, 73, 74 R, 74 A; 191/23 R, 23 A, 30, 31, 32, 35, 40; 104/106–112, 115; 238/10 R, 10 E, 10 F, 109

[56] References Cited
UNITED STATES PATENTS

| | | | |
|---|---|---|---|
| 2,746,110 | 5/1956 | Bedford, Jr. ................. | 248/68 R X |
| 2,912,526 | 11/1959 | Herrmann et al. .................... | 191/35 |
| 3,253,084 | 5/1966 | Taylor ....................... | 24/73 AP UX |
| 3,337,697 | 8/1967 | Martin et al. ..................... | 191/23 R |
| 3,506,099 | 4/1970 | Howell, Jr. ........................ | 191/23 A |
| 3,590,173 | 6/1971 | Stahmer ........................ | 191/23 A X |

FOREIGN PATENTS OR APPLICATIONS

| | | | |
|---|---|---|---|
| 1,290,461 | 3/1962 | France ............................ | 174/40 CC |
| 1,311,393 | 10/1962 | France ............................ | 248/68 R |
| 29,562 | 1/1956 | Germany ........................ | 191/23 A |
| 1,021,496 | 3/1966 | United Kingdom ............... | 248/74 A |
| 429,816 | 8/1967 | Switzerland ..................... | 191/23 A |

*Primary Examiner*—Laramie E. Askin
*Attorney, Agent, or Firm*—Robert E. Krebs; Thomas S. MacDonald

[57] ABSTRACT

A resilient bracket for supporting current conducting rails and the like includes a body section having three parallel, open-sided channels formed therein. Three legs are spaced laterally across the body to extend toward a supporting surface with the channels facing away from the surface. The middle leg includes fastening means to secure the body section to the surface so that the outer two legs are in compression and the body section is flexed in a manner which decreases the distance between the sidewalls of the channels causing the conducting rails to be firmly gripped therein.

15 Claims, 3 Drawing Figures

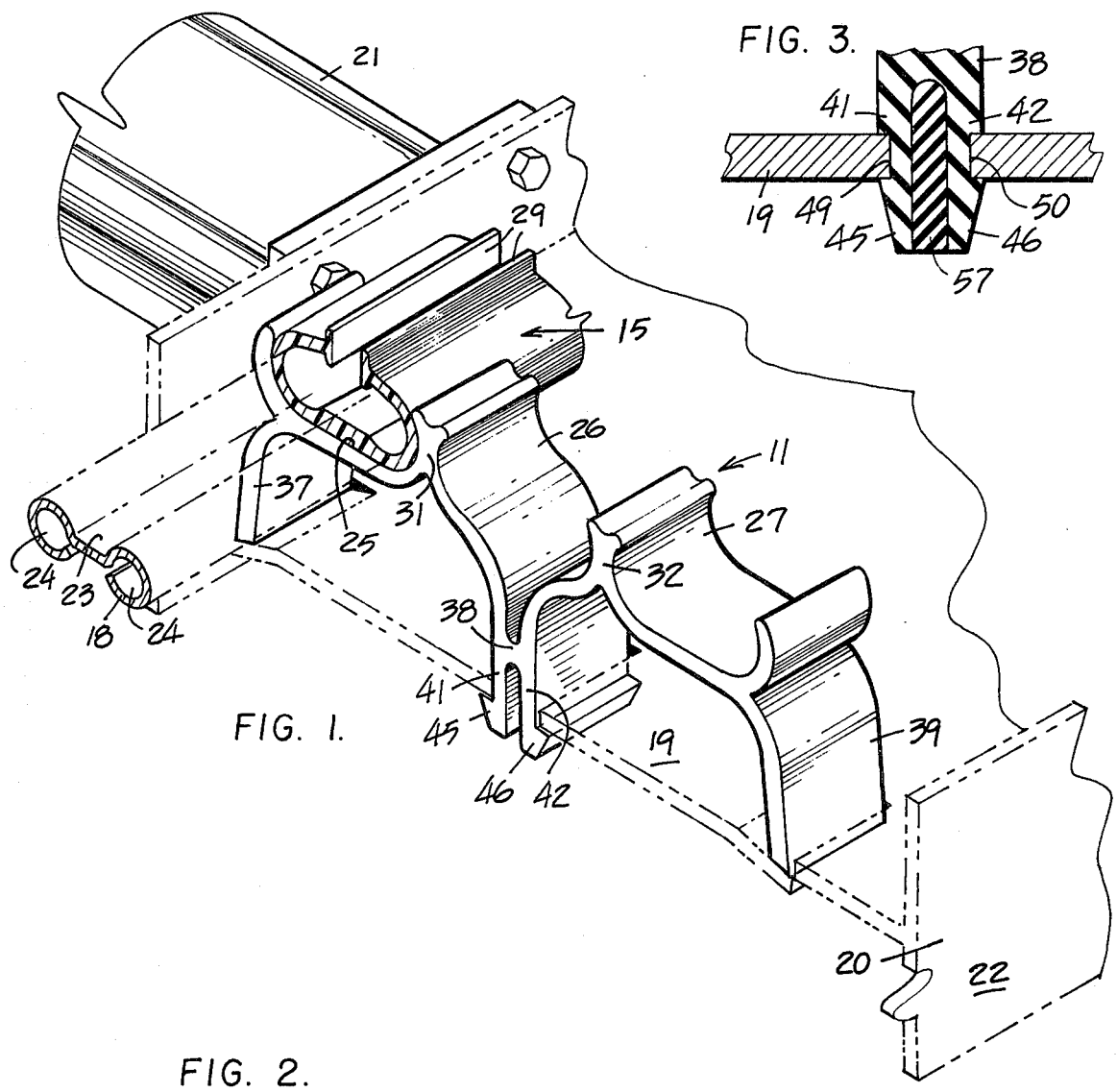

BRACKET FOR CONDUCTORS

This invention relates generally to a current conducting rail system and, more particularly, to a support device on which electrified rails are mounted.

Electrified rails are widely used for providing power to overhead conveyors, monorails, and various other trolley-type devices. A particularly interesting application of electrified rails is in textile plants where thousands of feet of rail are utilized to power both vacuum and blowing type traveling cleaners which automatically move through the plant to remove lint and the like from floor and machinery surfaces.

In typical installations, it is necessary to provide many spaced-apart brackets for supporting the electrified rails. The present invention provides a convenient, safe, dependable and easily-installed device for supporting such rails, all at cost substantially less than that of prior devices.

Further advantages of the present invention can be readily ascertained by reference to the following description and appended drawings, which are offered by way of example only and not in limitation of the invention, whose scope is defined by the appended claims and equivalents. In the drawing, FIG. 1 is a perspective view of a device according to the invention; FIG. 2 is a front sectional view of the device of FIG. 1; and FIG. 3 is a particular modification of the portion of the device of FIG. 2 encircled by the arrows 3—3.

The bracket 11 in FIG. 1 is provided to support a plurality of insulating shields 15 which retain partially exposed electrified rails 18 parallel to the web 19 of a horizontally extending structural I-beam 20 or the like. In practice, the I-beams are usually supported by members 21 so that the web 19 of the beam presents a vertical surface upon which the brackets are mounted with the electrified rails 18 extending horizontally, one above the other; FIGS. 1 and 2, however, show the web 19 horizontally disposed for purposes of illustration. Also, in practice, the top surface 22 of the I-beam carries a wheeled mechanism that includes a projecting arm to which a contact shoe or collector is connected to ride against and draw power from the exposed surfaces of the electrified rails.

The illustrated rails 18 are elongated or strip-like current-conducting members which have flat medial portions 23. The logitudinal sides of the strips are curled back towards the medial portion to form generally circular eyelets 24. Various other electrified rails, which differ somewhat in configuration from the illustrated ones, are commercially available and can be readily utilized with the brackets and shields which will hereinafter be described.

The illustrated shields 15 are long hollow tubes or channels having open sides to expose continuous strips along the flat medial portions 23 of each of the rails 18. In cross-section, the illustrated shields 15 are generally elliptical or C-shaped. The shields are preferably fabricated from a plastic material which is electrically insulating, such as polyvinyl chloride. The walls of the shield are preferably thin enough that the shields are slightly resilient so that the electrified rails or other types of electrical conductors can be readily clipped into place. The shields protect the rails from unintentional contact, which could result in short circuits or severe shocks, and also help to keep the conductors clean, which is especially important in industrial environments. In the illustrated embodiment, elongated tab members 29 are connected to the longitudinally extending edges of the open sides of the shields. The tabs retainably press the rails deeply into the shields and aid in retaining the rails 18 therein. Also, the tabs add rigidity to the edges of the shields and provide additional wear surfaces.

The illustrated bracket 11 includes a body section that is formed to define three open-sided channels 25, 26, and 27, respectively, which are disposed side-by-side and shaped to hold the electrified rails 18 parallel to one another in a common plane. More particularly, the channels or "cavities" each include concavely curved sidewall portions 30–33 that extend toward one another across the open side to retain the shields and electrified rails within the cavities. Preferably, the walls of the channels are thin enough that the bracket itself is fairly resilient. In the illustrated device, the side walls 31 and 32 of the central cavity 26 are common to, or shared with, the side walls of the outer two cavities 25 and 27; accordingly, the width of the central cavity 26 is decreased when either of the end cavities 25 or 27 is pressed further open, or vice versa. The outer two channels 25 and 27 are generally elliptical in cross-section and generally conform to the exterior configuration of the aforementioned shields 15. The bottom walls or floors 34 and 35 of those outer two cavities 25 and 27 are generally flat, but the bottom of the central cavity is preferably generally cuspate, for reasons which will be explained hereinafter.

The illustrated bracket further includes three integral legs 37, 38, and 39 which are spaced apart across the width of the body section and which are provided to hold the electrified rails coplanar at a constant distance away from a supporting surface with the open sides of the channels facing away from the surface and the legs extending toward the surface. The outer two legs 37 and 39 extend nearly directly beneath the outer side walls of the two end cavities 25 and 27, and the middle leg 38 is disposed nearly in the middle of the bracket and is somewhat longer than the two outer legs. Preferably the outer two legs are of equal length and are equally spaced from the middle leg. In special applications, however, the outer two support legs 37 and 39 could be unequal in length so that the bracket is tilted slightly.

According to the invention, the middle leg 38 includes means by which the bracket can be attached or secured to a supporting surface, such as the web 19 of the illustrated I-beam. In the preferred embodiment, the lower end of the middle leg is longitudinally bifurcated so that it has two downwardly extending resilient prongs 41 and 42, and the distal ends of the prongs have integral wedge-shaped members 45 and 46, respectively, formed on their outer surfaces. The narrow ends of the illustrated wedges are coterminous with the ends of the prongs and shallow locating grooves 49 and 50 are formed in the outer sides of the prongs above the broad ends of the wedge members 45 and 46, respectively.

Preferably, the bracket is fabricated from the same electrically insulating material as the shields. For some uses, however, the brackets can be made of metal, such as aluminum, or from other non-insulating materials. It should be appreciated that the illustrated brackets and shields can be readily extruded as single pieces which can then be sliced transversely to the desired length. Usually, the brackets are about three-quarters inch long and the shields are several feet long.

To install the shields in a bracket according to the invention, the bracket must be sprung backward slightly until the shields 15 can be forced or snapped into place one-by-one. The bracket is shaped and dimensioned such that with all three shields installed, the bracket is slightly convex or curved away from the conductor cavities and the shields are relatively loosely held. The cuspate shape of the central cavity 26 in the illustrated bracket permits the bracket to be readily sprung open.

To install the bracket on the web 19 of the I-beam 20, a slot 53 is formed through the web and then the bifurcated end of the middle leg is forced through the slot. Once the wedge members 45 and 46 pass the slot 53, the prongs spring apart and the broad ends of the wedges engage the back face of the web 19. With the illustrated bracket, the edges of the slot in the I-beam locate in the grooves 49 and 50 above the wedges and, thereby, the middle leg 38 is restrained from slipping further through the slot. As the middle leg is forced into the supporting surface, the outer two legs 37 and 39 are concomitantly pressed upwardly and placed in compression by the supporting surface 19 thereby causing the bracket to lose its convex shape and causing the width of the cavities to decrease slightly which, in turn, causes the insulating sheaths to be tightly squeezed. Preferably, the legs 37–39 are equally spaced apart across the width of the bracket body so that the stresses and forces are generally equally distributed. The cuspate shape of the middle cavity permits the bracket to be easily flexed as the middle leg is being secured to a support surface.

In the particular embodiment illustrated in FIG. 3, a plug-like member 57 is fitted into the space between the prongs 41 and 42 on the end of the bifurcated middle leg 38. When the bracket is formed from plastic, the plug 57 is preferably also plastic and is coated with polyvinylchloride solvent which acts as a lubricant for inserting the plug before the volatile agents in the solvent evaporate and, thereafter, the plug is bonded to the bracket by the action of the solvent. Without such a solvent or bonding agent, the plug functions as a removable retainer or key. With the inclusion of the plug 57, the middle leg is much stronger due to the effective increase in cross-sectional area.

It is within the scope of this invention to provide alternative means for securing the middle leg 38 of the bracket 11 to a supporting surface. For example, the middle leg could be drawn to the supporting surface by a screw threaded thereinto. In such a case, the bracket would be fabricated with the middle leg shorter than the two outer legs so that during installation the bracket would be forced to lose its convex shape as the middle leg was drawn to the supporting surface. When either this modified embodiment of the bracket or the preferred embodiment has been installed on a supporting surface, the bracket is constructed and arranged so that the outer two outer support legs are in compression, the middle leg is in tension, and the body section is flexed to decrease the distance between the side walls of the channels.

Although the bracket has heretofore been described for use with the insulating shields, the bracket can be used for supporting conductors without such shields. In such a case, the channels in the bracket would be shaped and dimensioned to hold the conductors directly. Also, the bracket of the invention can be adapted to carry current conductors, such as cables, rather than electrified rails. For such alternate applications, there usually is no necessity that the conductors be held strictly coplanar and at a constant distance from the supporting surface, and the bracket can be modified accordingly.

In the illustrated arrangement, a pair of shallow kerfs or partially punched-out tongues 55 are formed in the supporting surface beneath the outer two legs 37 and 39. The ends of those legs rest upon those tongues and the outer sides of the legs press against the contiguous edge of the beam so that the bracket is restrained somewhat from moving sideways on the beam. The kerfs are, however, optional and the bracket 11 will provide adequate support on a completely smooth surface.

I claim:

1. A resilient bracket formed by extrusion for supporting elongated tubular members comprising:
    a. a body section which is an extruded form which defines three parallel opensided channels which are disposed side-by-side to each hold one of the elongated members in parallel, the side walls of each of said three channels being concavely formed to extend toward one another across the open sides to retain the elongated tubular members within said channels the floor section of the middle one of said channels being cuspate;
    b. three elongated legs formed integrally with said body section by extrusion and spaced-apart laterally across said body section to support the elongated members from a supporting surface with the open sides of said channels facing away from the supporting surface and said legs extending toward the surface, the outer two of said legs being of a length for supporting said body section on the supporting surface, and the middle one of said legs extending from said cuspate floor section and including fastening means adapted to secure said body section to the supporting surface so that said outer two legs are in compression and said body section is flexed in a manner which decreases the spread of said cuspate floor section of said middle one of said channels.

2. A bracket according to claim 1 wherein the distal end portion of said middle leg is bifurcated and said fastening means includes wedge members which are formed on the outer surfaces of said bifurcated portion, said wedge members being arranged so that their narrow ends are adjacent the end of said bifurcated portion, said wedge members being adapted to retain said bifurcated portion with a slot formed through the supporting surface.

3. A bracket according to claim 2 wherein locating grooves are formed in the outer surfaces of said bifurcated portion above the broad ends of the wedge members for locating against the edge of the supporting surface.

4. A bracket according to claim 2 wherein said outer two legs are shorter than said bifurcated middle leg.

5. A bracket according to claim 4 wherein said legs are shaped and dimensioned to hold said elongated members equidistant from the supporting surface.

6. A bracket according to claim 4 wherein the outer two of said channels are generally elliptical or C-shaped in cross-section.

7. A bracket according to claim 6 wherein the open sides of said channels are formed too narrowly to freely admit the elongated members thereinto.

8. A bracket according to claim 1 wherein said body section and said legs are made of an electrically insulating material.

9. A bracket according to claim 1 wherein said channels in said body section are formed to hold the elongated members parallel to one another in a common plane.

10. A bracket according to claim 1 wherein said legs are equally spaced apart across the width of said body section.

11. A resilient apparatus formed by extrusion for supporting elongated electrified rails comprising:
 a. elongated hollow shielding channels made from an electrically insulating material to hold the electrified rails, said shielding channels each having an open side to expose a continuous strip along each of the rails;
 b. a bracket including a body section which is an extruded form and which defines three parallel open-sided bracket channels which are disposed side-by-side to each hold one of said shielding channels for the electrified rails in parallel and in a common plane, the side walls of each of said three bracket channels being concavely formed to extend toward one another across the open sides, the floor section of the middle one of said bracket channels being cuspate;
 c. said shielding channels being disposed within said bracket channels with said open sides of said shielding channels being aligned with the open sides of said bracket channels to expose said strips along said rails;
 d. three elongated legs formed integrally with said body section by extrusion and spaced-apart laterally across said body section to support the shielding channels from a supporting surface with the open sides of said shielding channels facing away from the supporting surface and said legs extending toward said surface, the outer two of said legs being of a length for supporting said body section on the supporting surface, and the middle one of said legs extending from said cuspate floor section and including fastening means adapted to secure said body section to said surface so that said outer two legs are in compression and said body section is flexed in a manner which decreases the spread of said cuspate floor section of said middle one of said bracket channels.

12. A resilient apparatus according to claim 11 wherein the distal end portion of said middle leg is bifurcated and said fastening means includes wedge members which are formed on the outer surfaces of said bifurcated portion, said wedge members being arranged so that their narrow ends are adjacent the end of said bifurcated portion and being adapted to retain said bifurcated portion within a slot formed through the supporting surface.

13. A resilient apparatus according to claim 12 wherein said outer two legs are shorter than said bifurcated middle leg.

14. A resilient apparatus according to claim 12 further including a plug member interposed in the space between the bifurcated portion of said middle leg for use after said bracket has been installed on a supporting surface.

15. A resilient apparatus according to claim 11 wherein the floors of the outer two channels are flat.

* * * * *

UNITED STATES PATENT AND TRADEMARK OFFICE
CERTIFICATE OF CORRECTION

PATENT NO. : 3,916,089
DATED : October 28, 1975
INVENTOR(S) : Donald Alfred Sloan It is certified that error appears in the above—identified patent and that said Letters Patent are hereby corrected as shown below:

Column 4, line 51: "with" should read as -- within --.

Column 4, line 63: "4" should read as -- 1 --.

Signed and Sealed this second Day of March 1976

[SEAL]

Attest:

RUTH C. MASON
Attesting Officer

C. MARSHALL DANN
Commissioner of Patents and Trademarks